(12) United States Patent
Muncaster et al.

(10) Patent No.: US 9,034,778 B2
(45) Date of Patent: May 19, 2015

(54) FAIL SAFE PROTECTIVE WRAPPING

(75) Inventors: John W. Muncaster, Ellis County, TX (US); Richard Norsworthy, Dallas County, TX (US)

(73) Assignee: Polyguard Products, Inc., Ennis, TX (US)

( * ) Notice: Subject to any disclaimer, the term of this patent is extended or adjusted under 35 U.S.C. 154(b) by 1554 days.

(21) Appl. No.: 11/881,197

(22) Filed: Jul. 27, 2007

(65) Prior Publication Data

US 2009/0029613 A1    Jan. 29, 2009

(51) Int. Cl.
*B32B 11/10*   (2006.01)
*B32B 3/08*    (2006.01)

(52) U.S. Cl.
CPC . *B32B 3/08* (2013.01); *B32B 11/10* (2013.01); *B32B 2307/202* (2013.01); *B32B 2571/00* (2013.01); *B32B 2605/08* (2013.01); *B32B 2605/18* (2013.01)

(58) Field of Classification Search
CPC ...... B32B 3/08; B32B 11/10; B32B 2605/18; B32B 2571/00; B32B 2605/08; B32B 2307/202

USPC .......................................... 442/229; 428/209
See application file for complete search history.

(56) References Cited

U.S. PATENT DOCUMENTS

| | | | | |
|---|---|---|---|---|
| 1,867,984 | A * | 7/1932 | Pistor | 138/145 |
| 3,332,799 | A * | 7/1967 | Parker | 442/150 |
| 5,120,381 | A * | 6/1992 | Nee | 156/187 |
| 2004/0127132 | A1* | 7/2004 | Berman et al. | 442/414 |

FOREIGN PATENT DOCUMENTS

| | | | |
|---|---|---|---|
| GB | 2231448 A | * | 11/1990 |
| JP | 2000292550 A | * | 10/2000 |

* cited by examiner

*Primary Examiner* — Elizabeth Cole
(74) *Attorney, Agent, or Firm* — Jack A. Kanz

(57) ABSTRACT

Electrically conductive paths are positioned in and extend transversely across the width of the backing of strips of wrapping material. The electrically conductive paths provide means for conducting electrical current through spirally wrapped protective materials from the surrounding earth to voids formed adjacent the overlapped edges of the wrapping material and thus permit cathodic protection for pipe surfaces exposed to voids formed as a result of improper application or bonding failures of the wrapping material.

4 Claims, 2 Drawing Sheets

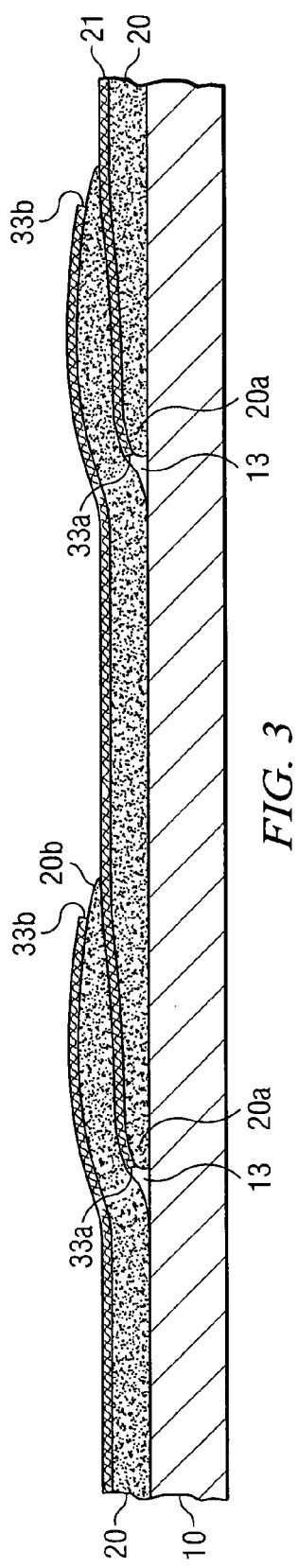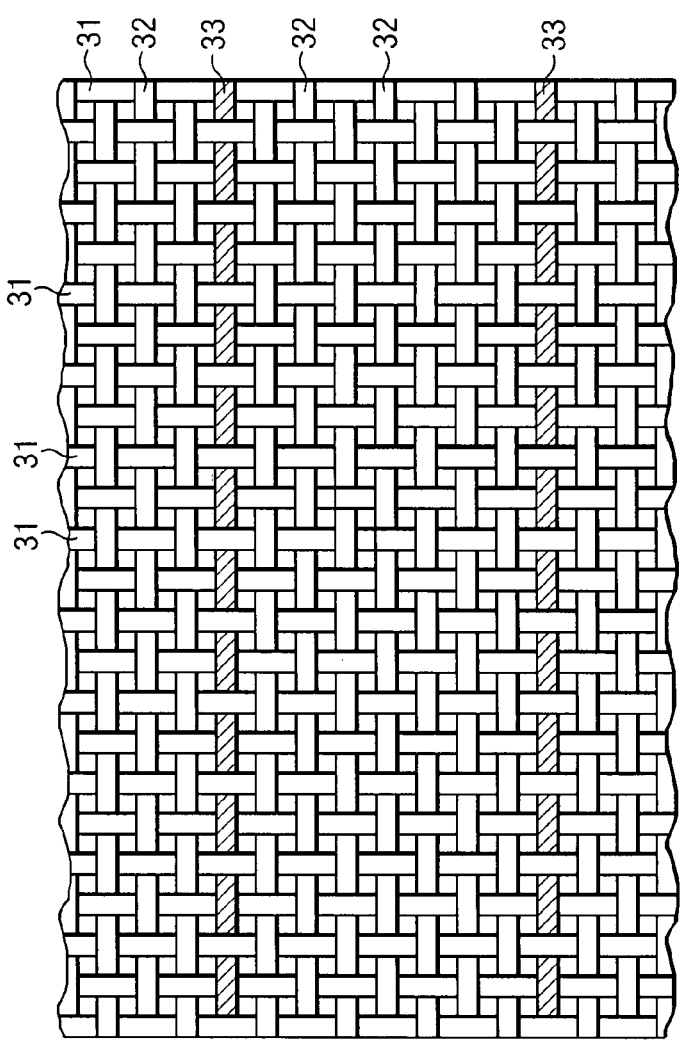
FIG. 3
FIG. 4

FAIL SAFE PROTECTIVE WRAPPING

This invention relates to protective wrapping for metallic pipe and the like. More particularly, it relates to protective wrapping materials for forming non-sag, non-shielding puncture-resistant protective coatings which include fail safe means for providing cathodic protection if voids are formed between the protective wrapping and the pipe.

Protection of buried metallic pipe from corrosion is a problem which has been approached and partially resolved in many ways. Conventionally, metallic pipe may be coated with any of a variety of materials such as fusion-bonded epoxy resin, hot-applied coal tar or asphalt, extruded polyethylene, glass cloth, asbestos felt and cold-applied plastic tapes. Sometimes combinations of protective coatings are applied and often cathodic protection is used wherein an electric current is applied to prevent corrosion where defects or holidays exist in the coating. All conventional coatings have certain advantages but all suffer from inherent disadvantages.

Protective wrappings for buried pipe are basically classified as either hot-applied or cold-applied. Hot-applied wrappings must be heated immediately prior to application in order to cause the protective material to flow sufficiently to adhere to the pipe and form a waterproof seal between overlapped edges of spirally wrapped coatings. Hot-applied coatings are, of course, difficult to apply and require special heating apparatus to properly heat the coating prior to application. Thus hot-applied coatings tend to be somewhat difficult and more expensive to apply, particularly on small projects. Hot-applied coatings also generally require an outer protective backing such as felt or a polyethylene film or the like applied in a second operation to provide mechanical protection for the hot-applied coating. Cold-applied coatings need not be heated to flow sufficiently to adhere to the pipe surface and, therefore, are much easier to apply. A typical cold-applied coating is a layer of cold-flowable rubberized bitumen carried on a support backing such as polyethylene film or the like.

Protective wrappings for buried pipe as described herein comprise a layer of waterproof or moisture-impervious material laminated to and carried on a support backing film. Most support films usually possess a characteristic known as memory or elasticity. When stretched under tension, the elastic characteristic causes the stretched film to tend to return to its original shape when tension is released. The coating is applied by stretching the support backing under tension as the coating is spirally wrapped on the pipe to squeeze the moisture-impervious layer and form a seal between the moisture-impervious layer and the pipe as well as between the moisture-impervious layer and the back side of the support backing at the over-lapped edges. Some cold-applied coatings include an elastic support backing such as polyethylene film or the like. Because of their elastic characteristics, such elastic support backings are advantageous in applying the coating around an irregular surface such as a valve, a T or the like.

While elastic material is satisfactory for some uses as a support backing in applying cold-flowable bitumens and the like, it suffers from several distinct disadvantages. Since the support backing is elastic, care must be taken to avoid over-stretching the wrapping material during application. If too much tension is applied to the wrapping strip, a condition known as "neck down" occurs wherein the width of the strip decreases as the length increases. Thus, instead of overlapping the edges as the strip is applied to the pipe, narrow spirals of pipe surface are exposed between the spirals of wrapping material. Furthermore, excessive stretching reduces the thickness of protective material layer applied and may cause undesirable wrinkles in the coating. The elastic characteristic of such films can also be detrimental after the film is stretched during application if the film is damaged by backfill while covering the coated pipe. For example, if a rock or other object tears a stretched film, tension will be relived and the film will draw away from the area of the tear to expose pipe surface to a corrosive environment.

If the backing material is elastic, it tends to sag and permit the coating to pull away from the lower sides of the pipe when the coated pipe is buried. Sagging results from the natural effects of gravity and is more often induced by a condition known as "soil stress" wherein the backfill material used to cover the buried pipe is compressed around the pipe and pulls the coating from the pipe. Heating the coating, as by flowing hot fluids (liquid or gaseous) through the wrapped conduit, can also cause elastic films to stretch and sag or pull away from the surface of the pipe. Because of the low thermal stability of most elastic films, such sagging may form large and seriously deleterious voids between the wrapped coating and the pipe walls, leaving the pipe exposed to water and corrosion.

Use of a continuous non-porous film as a backing support also inhibits cathodic protection of voids (sometimes called holidays) in the protective coating. In order for cathodic protection to effectively protect exposed metal, substantially all the exposed metal surface area must be in electrical contact with the surrounding earth to be accessible to the protective effect of an electrical current. However, if holidays form in the moisture-impervious layer between the pipe and a non-porous support backing, the holiday is effectively isolated from the surrounding earth by the support backing but still may collect water or other corrosive fluids by migration from other interconnected voids. Accordingly, if a holiday occurs in the moisture-impervious layer between the film and the pipe surface, the support backing will totally shield the pipe surface from the effects of cathodic protection. Similarly, if there is an opening in the film covering a holiday but the holiday in the moisture-impervious layer is larger than the opening in the film, the electric current path will be restricted to an area substantially equivalent to the size of the opening in the film. For example, if a sag occurs as a result of backfill or soil stress on a buried pipe, a holiday can occur in non-porous film where the moisture-impervious layer is damaged or displaced from the pipe surface. However, the surface area of exposed pipe is usually much larger than the opening in the film. Water (and thus electrical current) can enter the opening in the film to permit water to fill the void between the pipe surface and the coating. However, electrical current will follow the path of least resistance to the conductive metal. Thus, if the opening in the film is small the amount of pipe surface subjected to cathodic protection will be limited to an area substantially equal to the size of the opening which is closest to the pipe. The remainder of exposed pipe surface will be subject to corrosion since it is not subject to cathodic protection.

A problem unique to spirally wrapped coatings is the formation of entrapped voids adjacent the covered edge of a spiral wrapping. When insufficient tension is applied to the wrapping material or the moisture-impervious material is too viscous, small voids (or a continuous spiral void) may be formed adjacent the covered edge of the spirally wrapped material. Similarly, such voids may be formed if the coating becomes dis-bonded from the pipe by mechanical damage, sagging or other release of the moisture-impervious material from the pipe surface. Moisture may form or migrate into such voids and, since they are sheltered from the surrounding earth by the support backing of the wrapping material, protective electrical current cannot flow through the voids between the pipe and the earth. Thus, when adhesion of the wrapping material fails and voids form under the protective wrapping, cathodic protection is not provided for pipe surfaces exposed to such voids.

In accordance with the present invention a non-shielding protective wrapping is formed by securing a layer of flowable moisture-impervious material on at least one surface of a support backing which includes or provides electrically conductive paths from the exposed outside edge to the covered inner edge of the wrapping material. Where the support backing is non-elastic, the present invention overcomes the sagging and memory problems associated with elastic support backings. Furthermore, the electrically conductive paths included in the wrapping material itself provide electrically conductive paths from the outside of the wrapping to the covered edge of the wrapping material so that current may flow between the earth surrounding the wrapped pipe and moisture which forms or collects in voids adjacent the wrapped edge when total sealing fails. Other features and advantages will become more readily understood from the following detailed description taken in connection with the appended claims and attached drawing in which:

FIG. 3 is a longitudinal cross-sectional view of a section of wrapped pipe illustrating void formations at the covered edges of spiral wrapping materials; and FIG. 4 is an enlarged view of the inner surface of a support backing incorporating transverse conductive paths in accordance with one embodiment of the present invention.

The attached drawing is incorporated into and forms part of the specification to illustrate exemplary embodiments of the invention. For clarity of illustration, like reference numerals designate corresponding elements throughout the drawing.

It will be recognized that the principles of the invention may be utilized and embodied in many and various forms, and it should be recognized that various materials may be used in fabricating the protective wrapping of the invention. For example, the support backing may be any suitable film or other suitable support backing material, either porous or non-porous, which adheres to and supports the protective coating material. Similarly, the protective coating material may be any compound or composition which adheres to and forms a moisture-impervious coating on metallic pipe when applied to the pipe surface. In order to demonstrate these principles, the invention is described herein by reference to specific preferred embodiments. The invention, however, is not limited to the specific forms illustrated and described.

Figure 1:
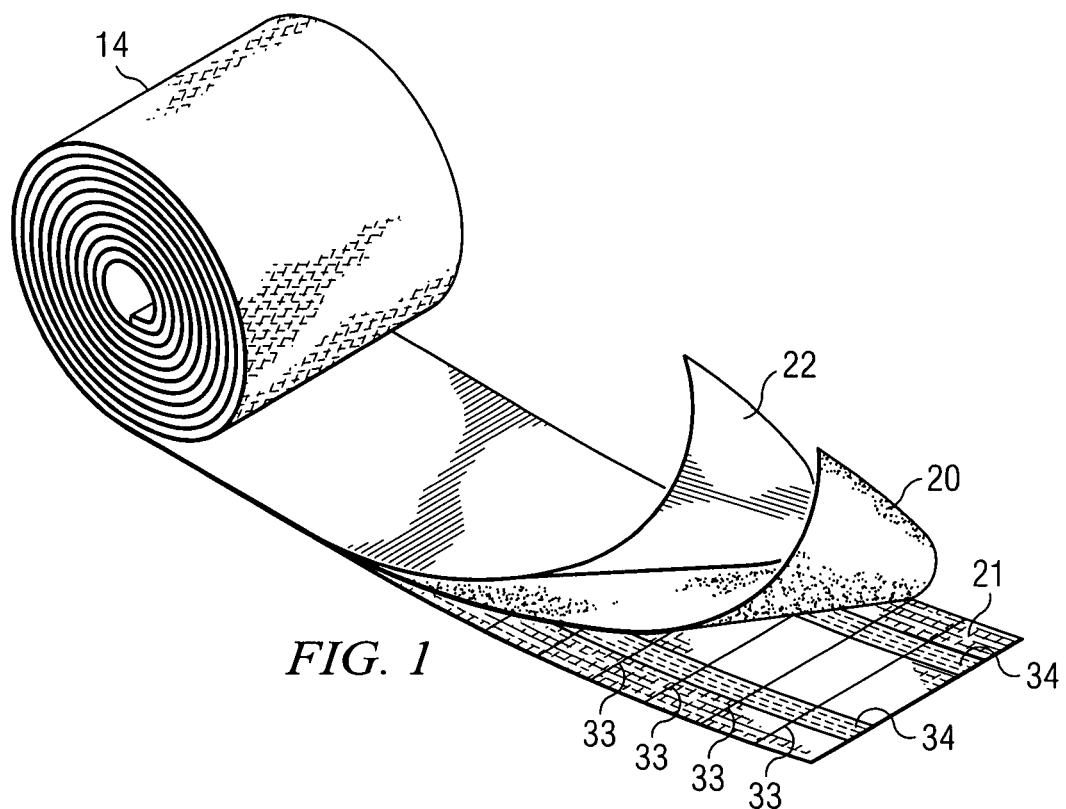
FIG. 1 is a partially exploded view of a roll of one embodiment of wrapping material incorporating transverse conductive paths in accordance with the invention.
Figure 2:
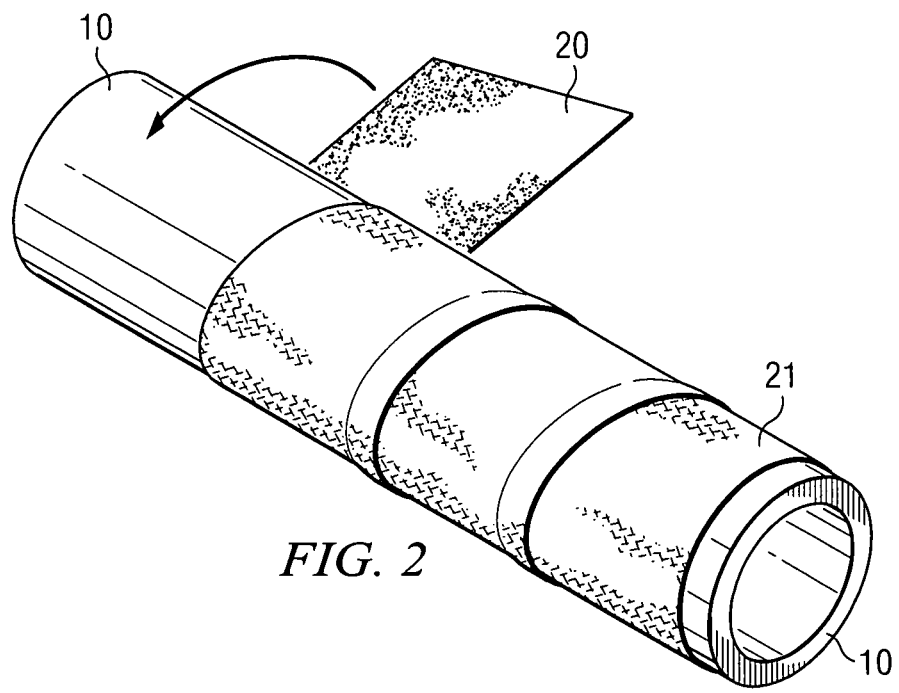
FIG. 2 is a perspective view of a pipe section illustrating application of a spirally wrapped coated in accordance with the invention.

While the principles of the invention are applicable to various cold-applied or hot-applied compositions and arrangements of wrapping materials, the preferred embodiment illustrated in the drawing comprises a layer of cold-flowable rubberized bitumen 20 laminated onto one surface of a substantially non-elastic support backing 21 in which is incorporated a plurality of transverse conductive paths as described in more detail hereinafter. The outer surface of the bitumen layer 20 is protected by a release sheet 22 to protect the bitumen prior to application. The product is preferably supplied in the form of a roll 14 of product having finite width and extended length as illustrated in FIG. 1 which may be applied to a pipe 10 or the like by removing the release sheet 22 and spirally wrapping the elongated product around the pipe 10 as illustrated in FIG. 2. For a more detailed description of the structure, composition and application of such wrapping materials (except for the formation and use of transverse conductive paths therein) reference may be had to U.S. Pat. No. 5,120,381 which is incorporated herein by reference.

In the embodiment illustrated in FIG. 4, the support backing 21 is preferably a basket weave fabric formed of essentially flat non-elastic thermoplastic fibers 31, 32 such as polypropylene or the like. Conductive paths extending across the weft of the backing fabric are provided by conductive strips 33. The conductive strips 33 may be formed of any suitable electrically conductive material such as metallic wires or strips. Alternatively, conductive strips may be formed of other materials which are coated or impregnated with conductive films or particles such as carbon or metallic particles. The strips 33 may, for example, be strips of cotton or similar absorbent material which are non-conductive when dry but which absorb water and become electrically conductive when wet. The conductive strips 33 may be woven into the fabric parallel with the weft strips 32 (or be substituted for the weft strips 32) or may be supported on carrier strips 34 and sandwiched between the support backing 21 and the bitumen layer 20 as shown in FIG. 1. Any other suitable means for incorporating conductive paths within the wrapping material which extend across the full width of the wrapping material from edge to edge may be used. It is only necessary that the ends of the conductive strips be exposed at the edges of the wrapping material to provide a path for conduction of electrical current from the outside of the wrapping material to a void formed at the covered inner edge of the wrapping material.

When the wrapping material is properly applied, the release sheet 22 is removed and the protective strip wrapped spirally around the pipe 10 as illustrated in FIG. 2. When spirally wrapped, the leading edge 20a of the strip is overlapped by the trailing edge 20b and, as pressure is applied, bitumen from the leading edge is squeezed from the strip and merges into the overlapping layer to uniformly cover and bond to the surface of the pipe 10. However, if insufficient tension is applied during wrapping (or if the bitumen is too viscous), the leading edge 20a may not merge with the overlapping bitumen, leaving a void 13 as illustrated in FIG. 3. In such cases, void 13 may form as a spiral void coextensive with the overlapped leading edge 20a of the wrapping strip. Similarly, voids may also be formed by dis-bonding of the bitumen and/or by migration of air bubbles or water bubbles between the surface of the pipe 10 and the bitumen layer 20. When moisture collects in such voids, the pipe surface exposed to the voids is subject to corrosion. When such voids are fully entrapped between the protective wrapping and the pipe surface, cathodic protection cannot be used to prevent corrosion.

In accordance with the invention, conductive paths 33 are positioned within the wrapping strip between the outer (exposed) surface of the support backing 21 and the outer (exposed) surface of the bitumen layer and extend from edge to edge. Thus, the ends 33a of the conductive paths 33 at the leading edge of the wrapping strip will always be positioned at the junction of the leading edge 20a of the bitumen layer and the overlapping outer surface of the bitumen layer. Accordingly, if a void 13 forms at this junction, the leading edge end 33a will be exposed to the void 13. Note, however, that the leading edge end 33a need not be in direct contact with the pipe 10. Instead, leading edge end 33a is insulated from direct contact with pipe 10 but will be in electrical contact with any electrically conductive matter (e.g. water) which collects within void 13. Since trailing edge end 33b of conductive path 33 is always on the outside of the wrapping, trailing edge ends 33b are in electrical contact with the surrounding earth. Accordingly, if any electrically conductive matter collects in void 13, conductive paths 33 provide an electrically conductive pathway through the wrapping material directly from the surrounding earth to the material in the void 13. However, if no electrically conductive matter collects in void 13, the surrounding earth is not conductively connected to the pipe 10 by conductive paths 33. The conductive paths 33 are merely suspended within the wrapping material to provide electrical communication with the surrounding earth if electrically conductive material collects in voids 13. It will be apparent, therefore, that conductive paths 33 may be supported at any location between the outer (exposed) surface of the support backing and the outer surface (the surface which contacts pipe 10) of the bitumen layer so that only the ends 33a, 33b thereof are exposed. Thus the ends 33b at the trailing edge of the wrapping strip will always be exposed to the surrounding earth. The overlapped ends 33a will either be buried in the bitumen layer 20a (if the pipe is properly wrapped and fully protected by the bitumen layer) or exposed to voids 13 formed at the overlapped edges. Accordingly, the conductive paths 33 are effectively electrically isolated from and form no electrical connection with pipe 10 unless an electrically conductive holiday forms adjacent the overlapped ends 33a.

Utilizing the principles of the invention, protective wrapping may be applied to pipe and the like to protect the pipe against corrosion when buried. Inclusion of the conductive paths as disclosed herein permits conduction of electrical current directly to failed portions of the wrapping material, thus providing a fail safe arrangement for providing cathodic protection where the wrapping material fails.

In the arrangement described, the conductive paths 33 provide a means for conducting electrical current from the surrounding earth through the wrapping material to voids 13 formed adjacent the leading edge of spirally wrapped wrapping material. Thus the invention provides a "fail safe" wrapping which permits cathodic protection of pipe surface exposed to moisture-containing voids between the pipe surface and the protective wrapping. The term "fail safe," as used herein, means that cathodic protection is afforded at such voids when sufficient current is provided to allow cathodic current to flow from the surrounding earth to the pipe surface through the conductive paths 33.

While only exemplary embodiments of the invention have been illustrated and described in detail herein, it will be readily recognized that the principles of the invention may be used in various forms to provide cathodic protection for wrapped pipe in which voids are formed by improper application or through dis-bonding or other failures of spirally wrapped protective materials. It is to be understood, therefore, that even though numerous characteristics and advantages of the invention have been set forth in detail herein, the foregoing description, together with details of the structure and function of the various embodiments, is to be considered illustrative only. Various changes and modifications may be made in detail, especially in matters of shape, size and materials as well as arrangement and combination of parts, without departing from the spirit and scope of the invention as defined by the appended claims.

What is claimed:

1. A wrapping material for buried pipe in the form of an elongated strip having a finite width comprising:
   (a) a support backing having an inner face and an outer face;
   (b) a layer of moisture-impervious material having an inner face and an outer face with its inner face secured to the inner face of said support backing; and
   (c) a plurality of conductive paths supported between the outer face of said moisture-impervious layer and the outer face of said support backing and extending the full width of said elongated strip wherein said conductive paths are water-absorbing materials which become electrically conductive when wet.

2. A wrapping material for buried pipe in the form of an elongated strip having a finite width comprising:
   (a) a support backing having an inner face and an outer face;
   (b) a layer of moisture-impervious material having an inner face and an outer face with its inner face secured to the inner face of said support backing; and
   (c) a plurality of conductive paths supported between the outer face of said moisture-impervious layer and the outer face of said support backing and extending the full width of said elongated strip wherein said conductive paths are strips of material which entrap moisture to form continuous electrically conductive paths.

3. A wrapped pipe comprising:
   (a) an axially elongated metallic pipe; and
   (b) a wrapping material in the form of an elongated strip having a finite width defining opposed edges spirally wrapped around said pipe so that one edge of said strip is adjacent the outer surface of said pipe and the opposite edge is exposed, said wrapping material comprising:
      (i) a support backing having an inner face and an outer face;
      (ii) a layer of moisture-impervious material having an inner face and an outer face with its inner face secured to the inner face of said support backing; and
      (iii) a plurality of conductive paths supported between the outer face of said moisture-impervious layer and the outer face of said support backing and extending the full width of said elongated strip wherein said conductive paths are water-absorbing materials which become electrically conductive when wet.

4. A wrapped pipe comprising:
   (a) an axially elongated metallic pipe; and
   (b) a wrapping material in the form of an elongated strip having a finite width defining opposed edges spirally wrapped around said pipe so that one edge of said strip is adjacent the outer surface of said pipe and the opposite edge is exposed, said wrapping material comprising:
      (i) a support backing having an inner face and an outer face;
      (ii) a layer of moisture-impervious material having an inner face and an outer face with its inner face secured to the inner face of said support backing; and
      (iii) a plurality of conductive paths supported between the outer face of said moisture-impervious layer and the outer face of said support backing and extending the full width of said elongated strip wherein said conductive paths are strips of material which entrap moisture to form a continuous electrically conductive path along the length of such strips.

* * * * *